United States Patent
Westerman

(10) Patent No.: US 6,529,638 B1
(45) Date of Patent: Mar. 4, 2003

(54) BLOCK BOUNDARY ARTIFACT REDUCTION FOR BLOCK-BASED IMAGE COMPRESSION

(75) Inventor: Larry Alan Westerman, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/241,829

(22) Filed: Feb. 1, 1999

(51) Int. Cl.$^7$ .................................................. G06K 9/40
(52) U.S. Cl. ........................................ 382/275; 382/268
(58) Field of Search ................................. 382/254, 268, 382/275, 232, 233, 294; 358/426, 432, 433

(56) References Cited

U.S. PATENT DOCUMENTS

| | | | |
|---|---|---|---|
| 4,941,043 A | 7/1990 | Jass | 358/133 |
| 4,975,969 A | 12/1990 | Tal | 382/2 |
| 4,991,223 A | 2/1991 | Bradley | 382/17 |
| 5,454,051 A | 9/1995 | Smith | 382/233 |
| 5,475,434 A | 12/1995 | Kim | 348/420 |
| 5,495,538 A | 2/1996 | Fan | 382/233 |
| 5,521,841 A | 5/1996 | Arman et al. | 364/514 A |
| 5,563,662 A | 10/1996 | Kishi | 348/420 |
| 5,563,718 A | 10/1996 | Wober et al. | 358/432 |
| 5,579,471 A | 11/1996 | Barber et al. | 395/326 |
| 5,590,064 A | 12/1996 | Astle | 364/715.02 |
| 5,625,714 A | 4/1997 | Fukuda | 382/233 |
| 5,647,058 A | 7/1997 | Agrawal et al. | 395/601 |
| 5,675,666 A | 10/1997 | Komuro et al. | 382/232 |
| 5,694,489 A | 12/1997 | Kishi | 382/233 |
| 5,694,492 A | 12/1997 | Kim | 382/262 |
| 6,167,164 A | * 12/2000 | Lee | 382/261 |

* cited by examiner

*Primary Examiner*—Thomas D. Lee
(74) *Attorney, Agent, or Firm*—Chernoff, Vilhauer, McClung & Stenzel, LLP

(57) ABSTRACT

Block boundary artifact reduction in decompressed digital images is accomplished by filtering the intensity of pixels in the vicinity of the block boundary. The filter utilizes filter coefficients selected from tables on the basis of the distribution of a scalar quantity describing the pixels neighboring the pixel to which the intensity adjustment is to be applied. The intensities of pixels at the boundary and one pixel removed from the boundary are adjusted. If interpolation pixels in each of neighboring blocks are of relatively constant intensity, the intensities of additional pixels, more remote from the boundary, are adjusted. Filter coefficients can be selected from different arrays for pixels on the boundary or removed from the boundary or if the pixel intensity adjustment is based on the intensities of pixels in a horizontal row or vertical column of interpolation pixels.

8 Claims, 2 Drawing Sheets

BLOCK BOUNDARY ARTIFACT REDUCTION FOR BLOCK-BASED IMAGE COMPRESSION

BACKGROUND OF THE INVENTION

The present invention relates to digital image reproduction and more particularly to a technique for reducing block boundary artifacts in digital images which have been subjected to block based image compression and decompression.

In various applications, including high definition television and video conferencing systems, it is desirable to store and transmit images in a digital form. The amount of data generated by converting images from analog to digital form is so great that digital transmission and storage of images would be impractical if the data could not be compressed to require less bandwidth and data storage capacity. As a result, a number of techniques have been developed to compress the digital data representing an image and a video sequence.

Several image and video compression techniques process digital image data by first dividing the image into 2-dimensional blocks. A common block size for block-based compression is an area eight pixels by eight pixels in size. Images and video may be processed in 8×8 blocks by algorithms specified by the ISO "JPEG" specification for still images, the CCITT "H.261" recommendation for video conferencing, and the ISO "MPEG" specification for video compression. After the image is divided into blocks, compression of the data proceeds on a block-by-block basis. There are several methods for processing the intrablock data and more than one method may be used. A common compression technique includes a transformation step where a transform, such as a discrete cosine transform (DCT), is applied to the intrablock image data to generate transform coefficients for each block of picture elements or pixels. The transformation is often followed by a quantization step where the transformed intrablock image data is replaced by quantized data which usually requires fewer data bits. The quantized data may be processed further and then stored or transmitted as compressed image data. When the compressed image data is received, the receiver reverses the process, decompressing the data and reconstructing the image.

The image compression methods with the highest compression efficiency are so called "lossy" methods. An image often contains considerable information, such as small detail, that contributes very little to a real observer's appreciation of the reconstructed image. When transformed this information appears as intermediate or higher frequency components which can be discarded following transformation. In addition, some degradation of the image may be acceptable in certain circumstances as a trade-off to reduce the amount of data which must be transmitted or stored. Discarding or losing "excess" information during the quantization of the transformed data is the core of the data compression effectiveness of lossy compression methods. On the other hand, much of the information discarded in block-by-block compression is data relevant to interblock relationships. Processing image data on a block-by-block basis and discarding information related to interblock relationships often results in a noticeable change in pixel intensity across the boundary between blocks of the reconstructed image. The "blocky" appearance of a decompressed image has been consistently recognized as a problem when using lossy compression methods for digital image processing.

Several strategies have been developed to reduce the block boundary artifacts in a decompressed digital image. For example, the H.261 compression—decompression technique incorporates an optional low pass filter that can be applied to all pixels of the image except those at the edge of the image. Applying the filter to all pixels of the image is time consuming and reduces the apparent image resolution. Another technique is the projection on convex sets (POCS) method which attempts to estimate the characteristics of the pre-compression image from the compressed data together with a model of the statistical characteristics of the image before compression. This method is successful in producing high quality decompressed images and eliminating block boundary artifacts. However, the computational complexity of the method makes it impractical for real time video applications.

Another strategy to reduce block boundary artifacts involves retaining some of the interblock correlation data when the image is compressed. Lossy compression commonly involves a transformation step where spatial domain image data is converted to a frequency domain representation by application of a mathematical transform, such as a discrete cosine transform (DCT). The DCT coefficients have been used to determine whether to apply a filter to the image data and, if so, to determine which filter to apply. The interblock correlation data can either be embedded in the transform coefficients or transmitted separately. However, the DCT coefficients which are not incorporated in the compressed data must be transmitted and stored separately from the image data reducing the efficiency of the data compression. Further, integration of this additional data in existing standards, such as the JPEG standard, is difficult or impossible.

Komuro et al., U.S. Pat. No. 5,675,666, disclose a technique for preprocessing image data before compression to compensate for the "block effect" artifact that would normally appear upon decompression of the image data. Error correction data is developed by a test compression and decompression of the image followed by computation of the error correction data from the differences between the input image data and the data for an output test image. The error correction data is added to the input image data so that when the image is compressed again and decompressed, subsequently, adjustments to reduce block boundary artifacts will have been made in the image data for pixels at the block boundaries. Preprocessing can be effective in reducing the boundary artifacts but requires access to the image content before compression.

Images may originate from many sources which do not have access to preprocessing capability. As a result, techniques of postprocessing the image to reduce block boundary artifacts after decompression in order to restore or enhance image quality have been proposed. One postprocessing technique of boundary artifact reduction is disclosed by Kim, U.S. Pat. No. 5,694,492. In this technique the compressed image data is received, decompressed and stored. A target pixel is identified and its data is filtered repeatedly until the absolute difference between the filtered and unfiltered data exceeds a predefined threshold. The process is repeated for each pixel in the image. This technique relies on repetitive filtering of data with a low pass filter having fixed coefficients. The iterative nature of the process is time consuming and computationally expensive. In addition, the fixed filter coefficients do not respond to local signal variations in the image resulting in less than optimal treatment of some discontinuities.

Chan et al., in a paper entitled A PRACTICAL POST-PROCESSING TECHNIQUE FOR REAL-TIME BLOCK- BASED CODING SYSTEM, IEEE Transactions on Circuits and Systems for Video Technology, Vol. 8, No.1 (February 1998) describe a postprocessing boundary artifact reduction technique based on a data-dependent, spatially-variant filter which operates on the pixels on both sides of the block boundaries. Filter coefficients are based on a vector quantization of pixel intensity values of several neighboring pixels on each side of the block boundary in the vicinity of the boundary pixel to which intensity adjustment will be applied. While this technique adjusts the filter in response to the local signal conditions, vector quantization is slow and computationally intensive. In essence, vector quantization is the comparison of a vector of pixel intensity values to a set of n dimensional vectors to determine the most representative vector. Further, the technique adjusts the intensity of only those pixels adjoining the boundary. This limits the available smoothing of the intensity change to reduce the boundary artifact. The limited depth of the adjustment zone is particularly apparent at boundaries between blocks of relatively constant intrablock intensity. However, adjusting more than a single row of pixels on each side of the boundary would substantially increase the time and computational resources necessary to perform artifact reduction with this vector-based method.

What is desired, therefore, is a post processing technique that requires no transmission or storage of transform coefficients, can be performed rapidly enough to be useful with digital video, is computationally conservative, and adjusts for local signal variations within the image to effectively reduce block boundary artifacts under a variety of circumstances.

SUMMARY OF THE INVENTION

The present invention overcomes the aforementioned drawbacks of the prior art by providing a method for reducing an artifact at a block boundary in a decompressed digital image including the steps of identifying a plurality of contiguous interpolation pixels including at least one pixel on each side of the block boundary; identifying one interpolation pixel on one side of the block boundary as a subject pixel; determining the distribution of a scalar characteristic of the interpolation pixels; selecting a set of filter coefficients correlated to the distribution of the scalar characteristic; modifying the intensity of the subject pixel by applying a filter producing the modified intensity as a function of the selected filter coefficients. In a preferred embodiment, the intensity of both a border pixel adjoining the block boundary and a neighboring pixel, adjoining the border pixel but one pixel removed from the boundary, are adjusted. Adjusting the intensity of pixels in a zone two pixels deep reduces the abruptness of the transition between blocks and improves block boundary artifact reduction by the linear filter. Basing the filter on a scalar characteristic of the pixel, such as its intensity, produces a method which is computationally conservative and can be performed rapidly enough to be used with video.

In a first aspect of the invention, different filter coefficients are applied if the subject pixel is a border pixel adjoining the block boundary or a neighboring pixel, one pixel removed from the block boundary. Providing a less aggressive adjustment to pixels remote from the block border further reduces the abruptness of the transition. In a second aspect of the invention, filter coefficients are selected from different tables of coefficients if the intensity adjustment is based on interpolation pixels in a horizontal row or a vertical column. Images characteristically have a different texture in the horizontal and vertical directions. In a third aspect of the invention, the intensities of additional pixels, more remote from the block boundary, are adjusted if the intensities of the interpolation pixels are substantially constant in the neighboring blocks. Increasing the depth of the adjustment zone along the block boundary is important to reducing the block boundary artifact between two relatively large areas of constant intensity.

The foregoing and other objectives, features and advantages of the invention will be more readily understood upon consideration of the following detailed description of the invention, taken in conjunction with the accompanying drawings.

DETAILED DESCRIPTION OF THE PREFERRED EMBODIMENT

Figure 1:
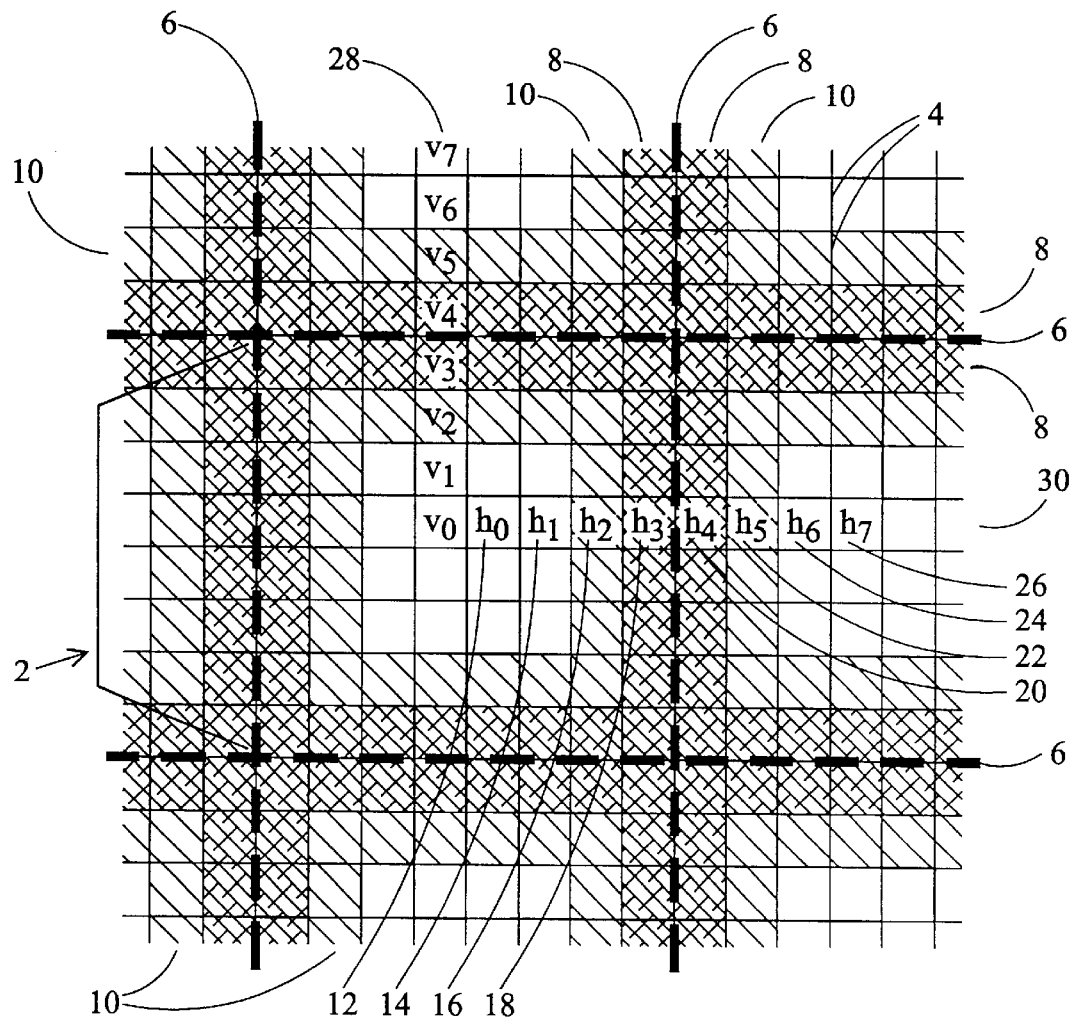
FIG. 1 is a schematic illustration of an exemplary video processing block.

Many digital image compression schemes, such as the ISO "JPEG" specification for still images and the ISO "MPEG" specification for video, rely, at least in part, on block-based image compression. Referring to FIG. 1, the image is divided into a series of two dimensional areas or blocks 2, indicated by a bracket, and processing proceeds on a block-by-block basis. A common size processing block is eight pixels 4 in height by eight pixels 4 in width. Following transmission or storage, the image is reconstructed by reversing the process to decompress the image on a block-by-block basis. Data compression efficiency can be enhanced by discarding some information related to the image which is considered unnecessary for a viewer's appreciation of the reconstructed image. The discarded information is generally related to intermediate or higher frequency components of the data which describe minor details of the image. With block-by-block compression techniques, a part of the discarded information describes the relationship between a block 2 and its neighbors. As a result, the intensity of the pixels in the decompressed image can change dramatically across the block boundaries 6. These artifacts of the block-by-block compression can result in visible blocks in the decompressed image. In the preferred embodiment, a spatially-variant linear filter is used to modify the intensities of pixels 4 near the block boundary 6 to reduce block boundary artifacts and smooth the transition between blocks. The coefficients of the filter are selected to correspond to the distribution of intensities of a group of pixels contiguous to the pixel to which the modification is to be applied. As a result, the filtering applied will be appropriate to the type and magnitude of the block boundary artifact present at that particular point in the image.

The linear filter of the preferred embodiment is of the general form:

$$\hat{h}_j = c_{ai} h_i + c_{aj} h_j + c_{ak} h_k + c_{al} h_l$$

where:
- i, j, k, and l are a plurality of contiguous interpolation pixels crossing a block boundary in a horizontal row or vertical column;
- $\hat{h}_j$ = the adjusted intensity of the subject pixel, j;
- $h_j$ = the unmodified intensity of the subject pixel, j, in the decompressed image; and
- $c_{ax}$ = a filter coefficient applicable to the intensity of the specified pixel.

The spatially variant linear filter is applied to adjust the intensity of pixels in the block border rows 8 on both sides of and adjoining to the block boundary 6. Improved artifact reduction is achieved by also applying a spatially variant linear filter to adjust the intensity of pixels in the neighboring rows 10, one pixel removed from the block boundary 6. Increasing the depth of the intensity adjustment zone further reduces the abruptness of the intensity transition and further smooths the transition between blocks.

It is to be understood that the particular filter selected may be linear or non-linear. The filter may be multi-dimensional although a one dimensional filter is preferred. Also, the filter may be an arbitrary width so long as it preferably includes the respective pixel being examined.

Figure 2:
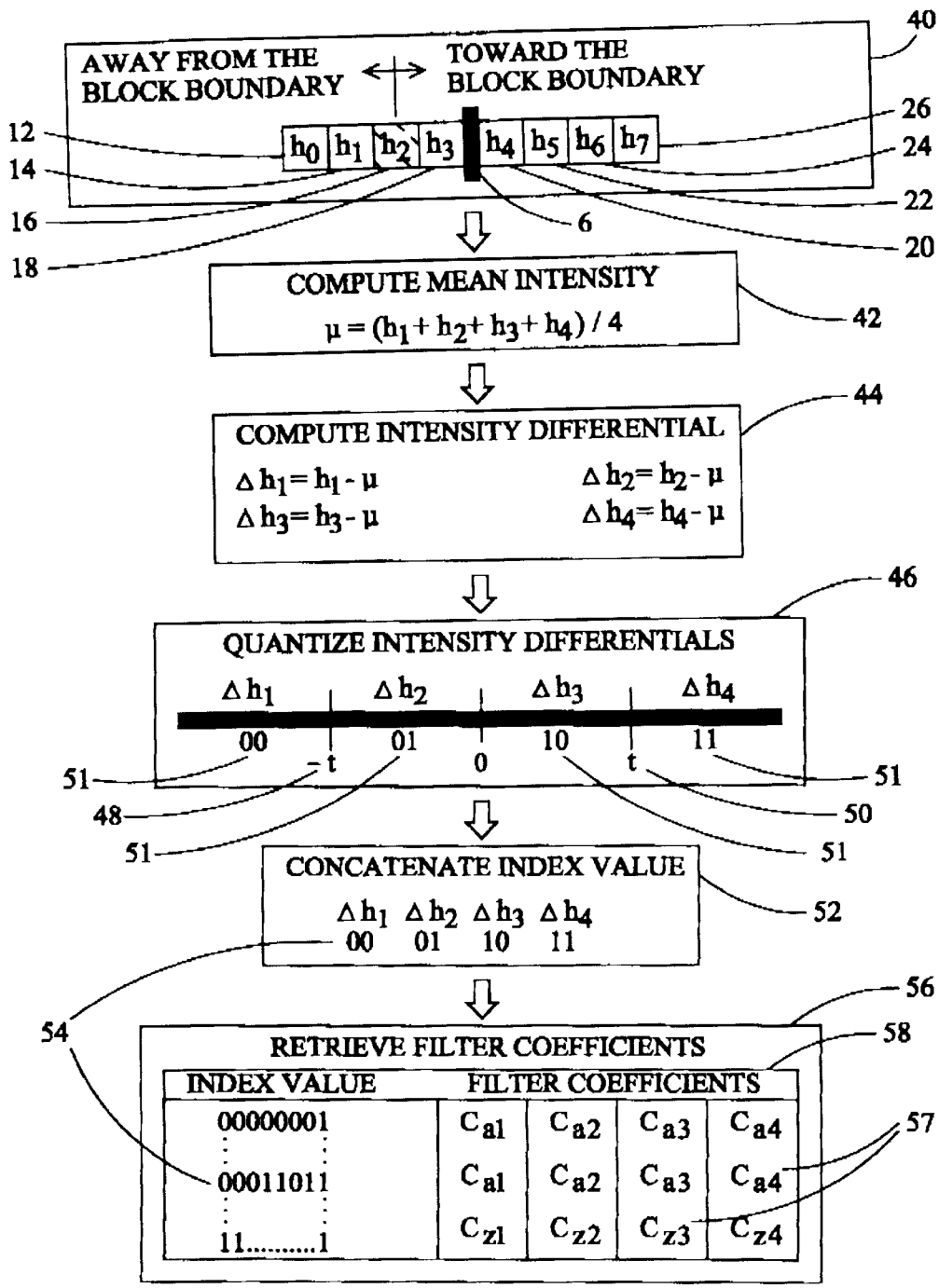
FIG. 2 is a flow chart illustrating a technique for selecting filter coefficients for a pixel intensity filter.

To apply the technique of block boundary artifact reduction of the preferred embodiment a group of contiguous interpolation pixels in a horizontal row 12, 14, 16, 18, 20, 22, 24, and 26 or a vertical column 28 of pixels (having intensities $v_0$ through $v_7$) is identified in a decompressed image, see FIG. 1. The interpolation pixels could be non-contiguous and not in a horizontal row or vertical column, if desired. One of the interpolation pixels in either the block boundary row 8 of pixels or the neighboring row 10 of pixels is identified as the subject pixel to which intensity adjustment will be applied. For example, the pixel 16 having intensity $h_2$ located in the block boundary row 8 is subject to intensity adjustment to reduce block boundary artifacts. The intensities of the subject pixel 16 and three contiguous neighboring pixels of intensities $h_1$ 14, $h_3$ 18, and $h_4$ 20 are utilized in adjusting intensity of the subject pixel 16. In general, the intensities of the subject pixel 16, its contiguous neighbor 14 in the direction away from the block boundary 6 and its two contiguous neighboring pixels 18 and 20 in the direction of the block boundary identified 40 and incorporated into the intensity adjustment filter, see FIG. 2. The filter appropriate for adjusting the intensity of the subject pixel 16 with intensity $h_2$ would include the intensities of pixels 14, 16, 18 and 20 and be of the form:

$$\hat{h}_2 = c_{a1}h_1 + c_{a2}h_2 + c_{a3}h_3 + c_{a4}h_4$$

Likewise the filters appropriate for adjusting the intensities of the pixels 18, 20, and 22 would be, respectively:

$$\hat{h}_3 = c_{b1}h_2 + c_{b2}h_3 + c_{b3}h_4 + c_{b4}h_5$$

$$\hat{h}_4 = c_{c1}h_5 + c_{c2}h_4 + c_{c3}h_3 + c_{c4}h_2$$

$$\hat{h}_5 = c_{d1}h_6 + c_{d2}h_5 + c_{d3}h_4 + c_{d4}h_3$$

The intensities of the subject pixel 16 and its three contiguous neighbors 14, 18, and 20 are also used to select the appropriate filter coefficients, $c_{ai}$, from a table of filter coefficients. In the case of the example subject pixel 16, the mean of the pixel intensities $h_1$ 14, $h_2$ 16, $h_3$ 18, and $h_4$ 20 is calculated 42. An intensity differential, the difference between the intensity of each of the four interpolation pixels and the mean intensity, is then calculated 44. By definition, if the intensities are not equal, the mean of the intensities must be greater than some of the individual intensities and less than others. Therefore, the intensity differentials will be both positive and negative.

It is to be understood that any other suitable statistical measure may be used to determine intensity variations.

The calculated intensity differentials are quantized 46 by sorting into four bins; negative and less than the negative of a threshold (−t) 48, negative but greater than or equal to the negative of the threshold; zero or positive but less than or equal to the positive of the threshold (t) 50; and positive and greater than the positive threshold. Experimentation with sample images indicates that a threshold intensity differential (t) between four and eight is appropriate with six being optimal. Each bin is represented by a two-bit number 51. The four, 2-bit, quantized intensity differentials are concatenated 52 to form a single 8-bit binary index value 54. The 8-bit index value 54 represents the intensity distribution of the four interpolation pixels for that subject pixel. The 8-bit index value 54 is used to select 56 appropriate filter coefficients 57 from a table 58 of index values 54 and corresponding filter coefficients 57. Since the index value 54 represents the intensity distribution of pixels in the vicinity of the subject pixel to which adjustment will be applied, the filter coefficients 57 selected for use in modifying the intensity of the subject pixel will be an optimal set of coefficients for the block boundary artifact at that point in the image. Since intensity differentials are both positive and negative, 81 combinations of index values can be eliminated as "not possible," which reduces the necessary size of the table.

It is to be understood that the number of "bins" into which the intensity differentials are mapped may be varied as desired. In addition, the values of the boundaries between the different "bins" may be selected as desired. Further, bin and bin boundaries need not be symmetrical or symmetrical about zero. Also, the technique of concatenation to obtain an index value may be replaced by any suitable technique to define the result of quantizing the intensity differentials. One technique for establishing appropriate values for filter coefficients, is to compress and decompress a series of test images with a lossy compression-decompression technique or codec to be used in the application. After the images have been compressed and then decompressed, the block boundaries 6 of the reconstructed image can be analyzed by comparing data related to the original image with that for the points at which artifact reduction might be applied in the "blocky" decompressed image. A technique such as the least-squares technique can be used to compute an optimal set of filter coefficients 57 for each set of data corresponding to a quantized index value derived from the intensity distribution of interpolation pixels crossing the block boundary. This can be accomplished by inverting the sense of the filter equations, above, using the intensities $\hat{h}_i$ and $h_i$ from actual pixel data and solving for the appropriate filter coefficients, $c_{ai}$, $c_{bi}$, $c_{ci}$, and $c_{di}$.

Another technique of establishing the values of filter coefficients 57 would be to calculate the coefficients. Each index value implies an intensity distribution of the corresponding interpolation pixels. The intensity distribution implied by the index value can be used to imply intensities of individual interpolation pixels for the purposes of calculating the appropriate filter coefficients. Any other suitable technique may likewise be used.

As illustrated in FIG. 1, border pixels 8 and neighboring pixels 10 may be part of a horizontal row 30 or a vertical column 28 of interpolation pixels. In addition, there are a number of pixels located in block border rows 8 or neighboring pixel rows 10 for both a horizontal and a vertical block border 6. The intensity of these pixels are filtered in both horizontal and vertical directions. The present inventor came to the realization that the intensity smoothing at the block boundary 6 may be improved by increasing the depth of the adjustment zone, that is, by adjusting the intensity of both the border pixel 8 and the pixels in the row one pixel removed from the border, the neighboring pixel 10. While the same filter coefficients can be used, the present inventor came to the realization that boundary artifact reduction can be further enhanced by selecting filter coefficients from different tables providing a more aggressive intensity adjustment for border pixels 8 than for neighboring pixels 10 which are further from the boundary. Likewise, filter coefficients may be selected from the same array of filter coefficients for pixels which will be adjusted on the basis of belonging to interpolation pixels in a horizontal row 30 or a vertical column 28. The present inventor's experimentation has shown that mixing the data obtained from horizontal and vertical sampling of test data to obtain a common set of coefficients affords excellent image quality and minimizes the data storage requirements. However, the human vision system anticipates different textures in images and nature in the horizontal and vertical directions and the filter coefficients used when processing pixels in a horizontal row 30 of interpolation pixels can be varied from those used when processing pixels in a vertical column 28 of interpolation pixels. To process pixels in the vicinity of the corners of the block, filtering can be performed in one direction, for example horizontal, followed by filtering in the other direction, for example vertical, using the filtered intensities from the first operation as input for the processing in the second direction.

When neighboring blocks of the decompressed image are of relatively constant intensity additional filtering at the common block boundary 6 is desirable to visually improve the block boundary transition. The present inventor came to the realization that increasing the depth of the adjustment zone by adjusting pixels further removed from the boundary improves the transition between the relatively large areas of uniform intensity. Referring to FIG. 1, if the group of interpolation pixels 12, 14, 16, and 18 and the group of interpolation pixels 20, 22, 24, and 26 in a neighboring block are each of substantially constant intensity adjusting the intensity of the pixels 12 and 14, three and four pixels removed from the boundary 6, in addition to the border pixel 18 and the neighboring pixel 16 enhances the reduction of the boundary artifact. Likewise, in addition to the border pixel 20 and neighboring pixel 22, pixels 24 and 26 would be adjusted in the neighboring block. If the intensity of the interpolation pixels are substantially equal in each block, the following filter equations are appropriate for pixels 12, 14, 16, and 18, respectively:

$$\hat{h}_0 = (15h_3 + h_4)/16$$

$$\hat{h}_1 = (13h_3 + 3h_4)/16$$

$$\hat{h}_2 = (11h_3 + 5h_4)/16$$

$$\hat{h}_3 = (9h_3 + 7h_4)/16$$

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

What is claimed is:

1. A method of reducing an artifact at a block boundary in a decompressed digital image comprising the steps of:
    (a) identifying a plurality of interpolation pixels including at least one pixel on each of a first side and a second side of said block boundary;
    (b) identifying one said interpolation pixel on said first side of said block boundary as a subject pixel;
    (c) computing the mean of an intensity said interpolation pixels;
    (d) computing an intensity difference between said mean intensity and said intensity of each of said interpolation pixels; and
    (e) quantizing said intensity differences;
    (f) constructing an intensity distribution index from said quantized intensity differentials;
    (d) selecting a plurality of filter coefficients correlated to said intensity distribution index;
    (e) modifying said intensity of said subject pixel by applying a filter producing said modified intensity as a function of said filter coefficients.

2. The method of claim 1 wherein said plurality of interpolation pixels comprise:
    (a) said subject pixel;
    (b) a first pixel adjoining a side of said subject pixel remote from said block boundary;
    (c) a second pixel on said second side of said block boundary and adjoining a side of said subject pixel nearest said block boundary; and
    (d) a third pixel adjoining a side of said second pixel remote from said subject pixel.

3. The method of claim 2 further comprising the steps of:
    (a) selecting a second plurality of filter coefficients correlated to a distribution of said scalar characteristic of said first pixel, said subject pixel, a second pixel on said second side of said block boundary and adjoining said subject pixel, and a third pixel adjoining a side of said first pixel remote from said block boundary; and
    (b) modifying an intensity of said first pixel by applying a filter producing said modified intensity of said first pixel as a function of said second plurality of filter coefficients.

4. The method of claim 1 wherein said plurality of interpolation pixels comprise:
    (a) said subject pixel;
    (b) a first pixel adjoining a side of said subject pixel remote from said block boundary;
    (c) a second pixel adjoining a side of said subject pixel nearest said block boundary; and
    (d) a third pixel on said second side of said block boundary adjoining said second pixel.

5. A method of reducing an artifact at a block boundary in a decompressed digital image comprising the steps of:
    (a) identifying a plurality of interpolation pixels including at least one pixel on each of a first side and a second side of said block boundary;
    (b) identifying one said interpolation pixel on said first side of said block boundary as a subject pixel;
    (c) computing a statistical measure of an intensity said interpolation pixels;
    (d) computing an intensity difference between said statistical measure intensity and said intensity of each of said interpolation pixels; and
    (e) quantizing said intensity differences;
    (f) constructing an intensity distribution index from said quantized intensity differentials;
    (g) selecting a plurality of filter coefficients correlated to said intensity distribution index;
    (h) modifying said intensity of said subject pixel by applying a filter producing said modified intensity as a function of said filter coefficients.

6. The method of claim 5 wherein said plurality of interpolation pixels comprise:

(a) said subject pixel;
(b) a first pixel adjoining a side of said subject pixel remote from said block boundary;
(c) a second pixel on said second side of said block boundary and adjoining a side of said subject pixel nearest said block boundary; and
(d) a third pixel adjoining a side of said second pixel remote from said subject pixel.

7. The method of claim 6 further comprising the steps of:
(a) selecting a second plurality of filter coefficients correlated to a distribution of said scalar characteristic of said first pixel, said subject pixel, a second pixel on said second side of said block boundary and adjoining said subject pixel, and a third pixel adjoining a side of said first pixel remote from said block boundary; and
(b) modifying an intensity cf said first pixel by applying a filter producing said modified intensity of said first pixel as a function of said second plurality of filter coefficients.

8. The method of claim 5 wherein said plurality of interpolation pixels comprise:
(a) said subject pixel;
(b) a first pixel adjoining a side of said subject pixel remote from said block boundary;
(c) a second pixel adjoining a side of said subject pixel nearest said block boundary; and
(d) a third pixel on said second side of said block boundary adjoining said second pixel.

* * * * *

UNITED STATES PATENT AND TRADEMARK OFFICE
CERTIFICATE OF CORRECTION

PATENT NO. : 6,529,638 B1 Page 1 of 1
APPLICATION NO. : 09/241829
DATED : March 4, 2003
INVENTOR(S) : Larry Westerman It is certified that error appears in the above-identified patent and that said Letters Patent is hereby corrected as shown below:

<u>Column 6, line 18</u>
Change "81" to --81--

<u>Column 7, line 66</u>
Change "intensity said interpolation pixels;" to --intensity of said interpolation pixels;--

<u>Column 8, line 8</u>
Change "(d)" to --(g)--

<u>Column 8, line 10</u>
Change "(e)" to --(h)--

<u>Column 5, line 52</u>
Change "...intensity said interpolation pixels;" to --...intensity of said interpolation pixels;--

<u>Column 10, line 1</u>
Change "cf" to --of--

Signed and Sealed this

Twenty-first Day of November, 2006

JON W. DUDAS
*Director of the United States Patent and Trademark Office*